UNITED STATES PATENT OFFICE.

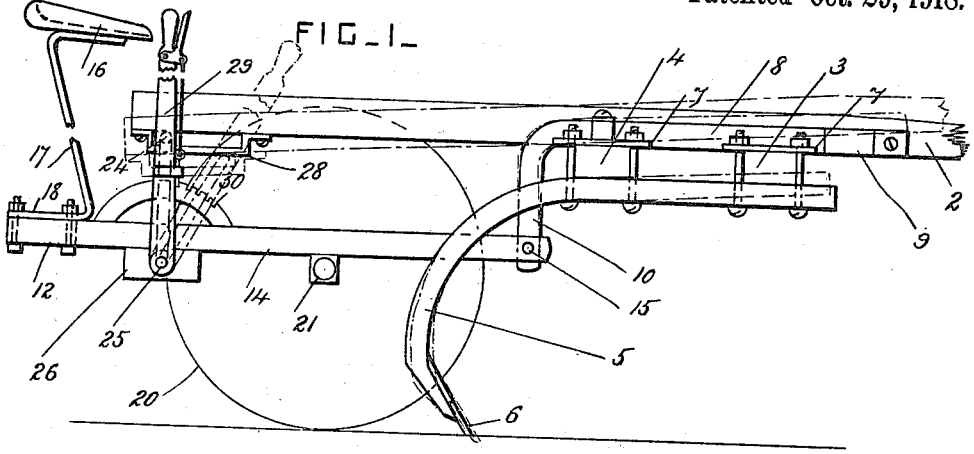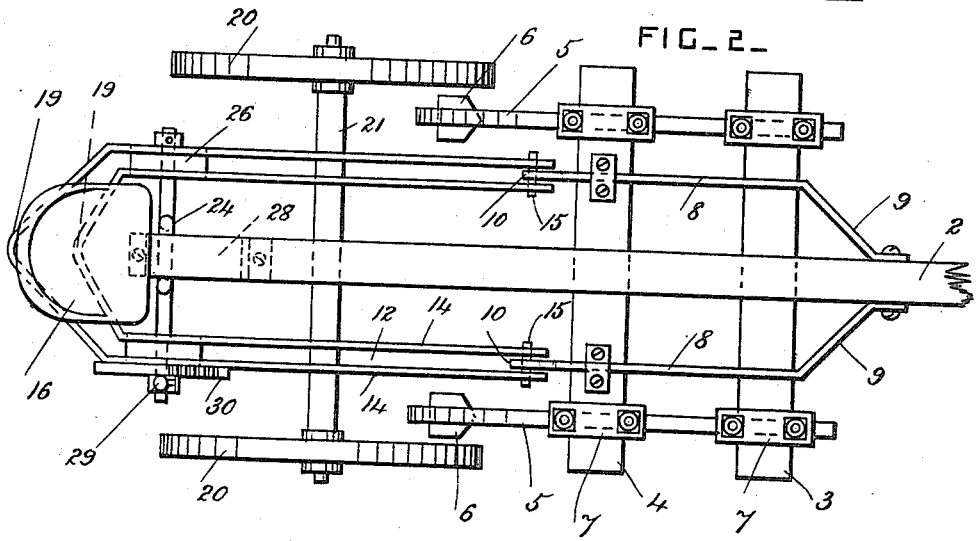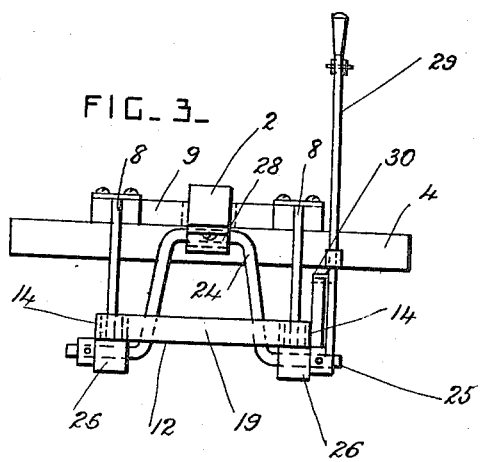

ED FLAIZ AND ALBAN T. HAWKYARD, OF OLATHE, COLORADO.

CULTIVATOR.

1,283,132.  Specification of Letters Patent.  Patented Oct. 29, 1918.

Application filed April 2, 1918. Serial No. 226,239.

*To all whom it may concern:*

Be it known that we, ED FLAIZ and ALBAN T. HAWKYARD, citizens of the United States, residing at Olathe, in the county of Montrose and State of Colorado, have invented certain new and useful Improvements in Cultivators, of which the following is a specification.

This invention relates to cultivators and more particularly to a machine specially adapted for use as an alfalfa marker; and it consists in the novel construction and combination of the parts hereinafter fully described and claimed.

In the drawings, Figure 1 is a side view of a machine constructed according to this invention, with one of the ground wheels removed. The dotted lines in Fig. 1 indicate the positions of the principal parts after the lever has been operated. Fig. 2 is a plan view of the machine. Fig. 3 is a rear end view of the crank and its co-acting parts.

The draft pole or tongue 2 has a front crossbar 3 and a rear crossbar 4 rigidly secured to it. The standards 5 of the cultivating or marking blades 6 are clamped to the two crossbars by any approved fastening devices 7, and are adapted to be adjusted to different distances apart.

Longitudinal frame bars 8 are provided, and rest on top of the crossbars, and have laterally angled portions 9 at their front ends which are secured to the center draft pole. The rear end portions 10 of the bars 8 are bent downwardly.

An adjustable frame 12 is provided, and is loop-shaped in form. The side portions of the frame 12 each consist of two parallel bars 14, the front ends of which are connected to the rear end portions 10 of the bars 8 by pivots 15. The looped rear end portions of the bars 14 are angle-shaped and are arranged at an angle to each other so that the apices of the loops 19 are more widely separated than the front portions of the bars 14. A seat 16 for the driver is provided, and is supported by a spring 17 having a foot 18 which is secured to the apices of the loops 19.

The ground wheels 20 are mounted on an axle 21 which is secured to the side bars of the adjustable frame 12. The frame 12 is adjusted by means of a crank 24, the crank shaft 25 of which is journaled in bearings 26 secured to the side bars of the frame 12. This crank engages with a loop-shaped bracket 28 secured on the underside of the rear part of the draft pole. A lever 29 is secured to one end portion of the crank shaft, and is arranged adjacent to the seat of the driver. Any approved form of catch mechanism 30 is provided for holding the operating lever in various positions, and a notched sector and retractable locking tooth as shown is a satisfactory device for that purpose.

A machine constructed in this manner is inexpensive to make, and is found to be efficient in action, and is not liable to get out of order. The height of the draft pole above the ground, and the depth of the cut of the blades or shovels in the ground, is regulated by means of the hand lever 29 and the crank shaft.

What we claim is:

1. In a machine of the class described, a central draft pole, crossbars secured to the draft pole, blades supported from the said crossbars, a loop-shaped frame, means for pivotally connecting the front end portion of the said frame with the said crossbars, a bracket secured to the rear part of the draft pole, a crank shaft journaled in bearings on the side portions of the said frame and provided with a crank which engages with the said bracket, wheels supporting the said frame, and means secured to the said crank shaft and operating to adjust the height of the said draft pole.

2. In a machine of the class described, a central draft pole, crossbars secured to the draft pole, blades supported from the said crossbars, two frame bars resting on the said crossbars and having angled front end portions which are secured to the draft pole and having downwardly projecting rear end portions, a loop-shaped frame the front end portions of which are pivoted to the rear end portions of the said frame bars, a bracket secured to the rear part of the draft pole, a crank shaft journaled in bearings on the side portions of the said frame and provided with a crank which engages with the said bracket, wheels supporting the said frame, and means secured to the said crank shaft and operating to adjust the height of the said draft pole.

In testimony whereof we affix our signatures.

ED FLAIZ.
ALBAN T. HAWKYARD.

Copies of this patent may be obtained for five cents each, by addressing the "Commissioner of Patents, Washington, D. C."